US007750300B2

(12) United States Patent
Wagner et al.

(10) Patent No.: US 7,750,300 B2
(45) Date of Patent: Jul. 6, 2010

(54) THERMO-OPTIC SYSTEM EMPLOYING SELF REFERENCE

(75) Inventors: Matthias Wagner, Cambridge, MA (US); Bruce M. Radl, Stow, MA (US); Bruce A. Horwitz, Newton, MA (US)

(73) Assignee: Redshift Systems Corporation, Burlington, MA (US)

( * ) Notice: Subject to any disclaimer, the term of this patent is extended or adjusted under 35 U.S.C. 154(b) by 446 days.

(21) Appl. No.: 11/709,113

(22) Filed: Feb. 21, 2007

(65) Prior Publication Data

US 2007/0194237 A1  Aug. 23, 2007

Related U.S. Application Data

(60) Provisional application No. 60/775,463, filed on Feb. 21, 2006, provisional application No. 60/851,480, filed on Oct. 13, 2006.

(51) Int. Cl.
*G01J 5/00* (2006.01)
*H01L 25/00* (2006.01)
*H01L 37/00* (2006.01)
*G01J 5/02* (2006.01)

(52) U.S. Cl. .................. 250/338.1; 250/332; 250/338.3; 250/339.02

(58) Field of Classification Search .................. 250/331, 250/332, 338.1, 339.02, 351, 338.3
See application file for complete search history.

(56) References Cited

U.S. PATENT DOCUMENTS

| | | | |
|---|---|---|---|
| 4,536,088 A * | 8/1985 | Rashleigh et al. ........... 356/477 |
| 4,558,342 A | 12/1985 | Sclar | |
| 4,594,507 A | 6/1986 | Elliott et al. | |
| 4,751,387 A | 6/1988 | Robillard | |

(Continued)

FOREIGN PATENT DOCUMENTS

WO   0136926 A1   5/2001

OTHER PUBLICATIONS

Zhao, J; "High Sensitivity Photomechanical MW-LWIR Imaging Using an Uncooled MEMS Microcantilever Array and Optical Readout", Proceedings of the SPIE, vol. 5783, pp. 506-513, 2005.

(Continued)

*Primary Examiner*—David P Porta
*Assistant Examiner*—Faye Boosalis
(74) *Attorney, Agent, or Firm*—BainwoodHuang

(57) ABSTRACT

A thermo-optic system, which may be used for example in thermal imaging, includes an array of optical elements each having a thermally responsive optical property, the optical elements including signal elements and reference elements configured to provide (1) a common-mode response of the optical property to ambient temperature and (2) a differential-mode response of the optical property to a thermal signal appearing across the array of optical elements. The system also includes an optical readout subsystem configured to (1) illuminate the array of optical elements with optical energy at a readout wavelength corresponding to the optical property so as to generate a composite optical signal having common-mode and differential-mode signal components corresponding to the common-mode and differential-mode responses respectively of the signal and reference elements, and (2) filter the composite optical signal to generate a filtered optical signal being substantially the differential-mode image component.

36 Claims, 12 Drawing Sheets

U.S. PATENT DOCUMENTS

| | | |
|---|---|---|
| 4,994,672 A | 2/1991 | Cross et al. |
| 5,034,608 A | 7/1991 | Tavrow et al. |
| 5,512,748 A | 4/1996 | Hanson |
| 5,543,620 A | 8/1996 | Lin et al. |
| 5,743,006 A | 4/1998 | Beratan |
| 5,994,699 A | 11/1999 | Akagawa |
| 6,080,988 A | 6/2000 | Ishizuya |
| 6,124,593 A | 9/2000 | Bly et al. |
| 6,166,381 A | 12/2000 | Augeri |
| 6,344,651 B1 | 2/2002 | Woolaway et al. |
| 6,498,347 B2 | 12/2002 | Sauer et al. |
| 6,583,416 B1 | 6/2003 | Villani |
| 6,770,882 B2 | 8/2004 | Carr et al. |
| 6,812,465 B2 | 11/2004 | Parrish et al. |
| 6,888,141 B2 | 5/2005 | Carr |
| 7,067,810 B2 | 6/2006 | Shigenaka |
| 7,109,495 B2 | 9/2006 | Lee et al. |
| 7,218,222 B2 | 5/2007 | Eskildsen |
| 7,247,850 B2 | 7/2007 | Laou |
| 2005/0082480 A1 | 4/2005 | Wagner et al. |
| 2005/0236554 A1* | 10/2005 | Fontaine et al. .......... 250/208.1 |
| 2007/0023661 A1 | 2/2007 | Wagner et al. |

OTHER PUBLICATIONS

Secundo, L, et al.; "Uncooled FPA with Optical Reading: Reaching the Theoretical Limit", Proceedings of the SPIE, vol. 5782, pp. 483-495, 2005.

Zhao, Y., et al.; "Optomechanical Uncooled Infrared Imaging System: Design, Microfabrication, and Performance", Journal of Microelectromechanical Systems, vol. 11, No. 2, Apr. 2002.

Senesac, J., et al.; "IR Imaging Using Uncooled Microcantilever Detectors", Ultramicroscopy 91 pp. 451-458, 2003.

Hunter, S., et al.; "High Sensitivity Uncooled Microcantilever Infrared Imaging Arrays", Proceedings of the SPIE, vol. 6206, Apr. 2006.

Lee, C.C.; "Temperature Measurement of Visible Light-Emitting Diodes Using Nematic Liquid Crystal thermography With Laser Illumination", IEEE Photonics Technology Letters, vol. 16, No. 7, Jul. 2004.

Hsieh, C.; "Focal-Plane-Arrays and CMOS Readout Techniques of Infrared Imaging Systems". IEEE Transactions on Circuits and Systems for Video Technology, vol. 7, No. 4, Aug. 1997.

Pope, T.D.; "Microblometer Detector Array for Satellite-Based Thermal Infrared Imaging", Proceedings of the 2004 International Conference on MEMS, NANO and Smart Systems, 2004.

Sato, Makoto, "Small-footprint Thermocapillary Optical Switch Combined with a Heater Array on a CMOS IC Chip", Optical Society of America, 2004.

Torun, H.; "Thermo-mechanical Detector Array with Optical Readout", IEEE 2006.

* cited by examiner

THERMO-OPTIC SYSTEM EMPLOYING SELF REFERENCE

CROSS REFERENCE TO RELATED APPLICATIONS

This patent application claims the benefit under 35 U.S.C. §119(e) of the following provisional US patent applications:
U.S. Patent Application No. 60/775,463 filed on Feb. 21, 2006 entitled "READOUT ARCHITECTURE FOR THERMO-OPTIC SENSOR SYSTEM";
U.S. Patent Application No. 60/851,480 filed on Oct. 13, 2006 entitled "METHOD AND APPARATUS FOR SELF-REFERENCED PHASE OBJECT IMAGING";
the contents and teachings of all the above applications being incorporated by reference herein.

BACKGROUND

The present invention relates generally to the field of thermo-optic systems, such as systems used for thermal imaging.

In the field of thermal imaging systems, it is known to employ certain device types and architectures to realize a desired function. For example, it is known to employ arrays of thermally sensitive devices along with other circuitry in thermal imaging systems, such as commonly used in military applications. Because of the low signal-to-noise ratios commonly found in operating environments, some systems employ cooled arrays of semiconductor sensor devices to reduce the noise associated with ambient thermal conditions, improving optical performance. However, such systems have typically been very expensive and complex, and thus their utilization has been limited to military and other applications that are relatively cost-insensitive.

Uncooled thermal imaging systems are also known. Such uncooled systems generally are constructed using micro-electrical-mechanical systems (MEMS) technology to create an array of thermally isolated microstructures electrically and mechanically interconnected to a custom CMOS readout. The CMOS readout generates a signal from each microstructure element and creates an electronic or visible image. Such uncooled systems generates high quality imagery but remain expensive due to the manufacturing complexity of fabricating a microstructure device integrated with a custom CMOS readout device. The use of electrical interconnects also degrades the performance of the device due to the thermal conductivity of the interconnects.

The use of optical readouts rather than CMOS readouts are advantageous as they do not require either an interconnected CMOS device or the use of electrical interconnects. However, optical readouts typically have low contrast due to large optical background signals generated when optically probing the thermal microstructure device. Signals from optically readout devices may also contain substantial non-uniformities that result from variations in manufacturing processes and readout techniques. The net result of all such background signals is reduced dynamic range and lower sensitivity.

A paper by J. Zhao entitled "High Sensitivity Photomechanical MW-LWIR Imaging using an Uncooled MEMS Microcantilever Array and Optical Readout" Proceedings of the SPIE, Vol. 5783, pp. 506-513, 2005 shows the use of a bi-material cantilever approach (deforms with temperature), along with a mechanically based way of compensating for manufacturing differences in films and ambient temperature. It appears that there are two segments to the bi-material cantilever section, one of which is thermally isolated and the other which is not, and these cause opposite bending on the reflector area. This will compensate to the degree the two segments can be made to behave identically mechanically.

Y. Zhao, M. Mao, R. Horowitz, A. Majumdar, J. Varesi, P. Norton and J. Kitching, "Optomechanical Uncooled Infrared Imaging System: Design, Microfabrication, and Performance" Journal of Microelectromechanical Systems, Vol. 11, No. 2, Apr. 2002 shows an approach based on bi-material cantilevers, some of which are metallized and some not. Even at ambient conditions, the different elements are already at significantly different levels, and therefore cause a high baseline optical level. This effect is extremely difficult to control because it is dependent on minute stresses in the films composing the structure, and moreover there will be a very large effect from ambient temperature. The authors conclude that their inability to control the substrate temperature to within better than 20 mK was the limitation on their system performance.

U.S. Pat. No. 6,124,593 to Bly et al. shows the use of thermo-mechanical Fabry-Perot filters as a readout for incident thermal radiation.

U.S. Pat. No. 6,766,882 to Carr et al. shows the use of pyro-optical material based pixels which change their absorption of visible or NIR carrier signal according to temperature, which is modulated by thermal radiation.

U.S. Pat. No. 4,594,507 to Elliott et al. shows an optically-read thermal imaging system. In this case, a "chopper" is used on the thermal radiation in order to modulate it temporally, and then an electronic readout system is used that can "lock in" to the modulation frequency and therefore extract the signal alone from signal +baseline.

US 2007/0023661 to Wagner et al. shows the use of thermo-optic materials in thin film interference filters which change their transmissive and reflective properties according to temperature, and the use of these devices to measure temperature in application including thermal imaging.

SUMMARY

Disclosed are techniques for reducing unwanted background and signal non-uniformity in optically read thermal devices, including those arising from manufacturing variations and non-uniformities, which if not addressed can reduce the usable dynamic range of a display transducer such as a CMOS or CCD transducer.

A thermo-optic system, which may be used for example in thermal imaging, includes an array of optical elements each having a thermally responsive optical property, the optical elements including signal elements and reference elements configured to provide (1) a common-mode response of the optical property to ambient conditions and (2) a differential-mode response of the optical property to a thermal signal appearing across the array of optical elements. The system also includes an optical readout subsystem configured to (1) illuminate the array of optical elements with optical energy at a readout wavelength corresponding to the optical property so as to generate a composite optical signal having common-mode and differential-mode signal components corresponding to the common-mode and differential-mode responses respectively of the signal and reference elements, and (2) filter the composite optical signal to generate a filtered optical signal being substantially the differential-mode image component.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
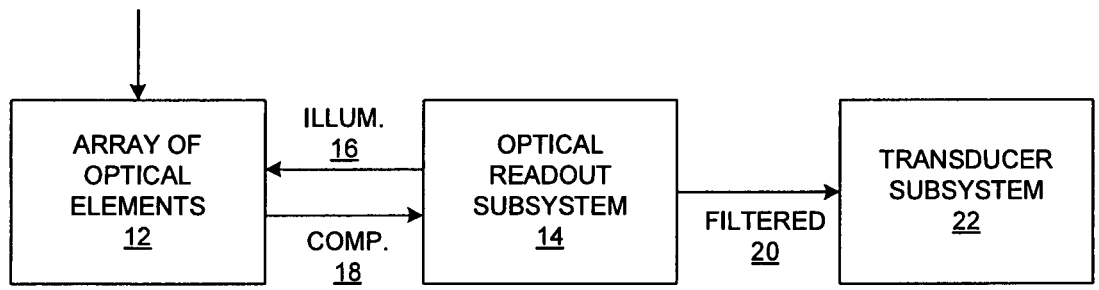
FIG. 1 is a block diagram of a thermo-optic system according to an embodiment of the present invention.

FIG. 1 shows a thermo-optic system in which a thermal signal 10 is supplied to an array of optical elements 12, also referred to herein as the "array" 12. An optical readout subsystem 14 generates an optical illumination signal (ILLUM) 16 for the array 12. The array 12 responds to the thermal signal 10 and the illumination signal 16 with a composite optical signal (COMP) 18, which is filtered within the optical readout subsystem 14 to generate a filtered optical signal (FILTERED) 20 (also referred to as an optical output signal). In the illustrated embodiment, the filtered optical signal 20 is provided to a transducer subsystem 22 which converts the filtered optical signal 20 to an electronic, optical or other pattern, such as a two-dimensional visible image for example.

The array 10 operates as a form of optical modulator that generates the composite image 18 by imparting modulation to the illumination signal 16 based on the thermal signal 10, thereby incorporating the information carried by the thermal signal 10 into the composite signal 18. In one embodiment as described below, the illumination signal 16 is a 2-dimensional near-infrared (NIR) optical signal, and the thermal signal 10 is a 2-dimensional distribution of long-wavelength infrared (LWIR) radiation incident on the system from an external source such as a collection of heat-radiating bodies. In such an embodiment, the transducer subsystem 22 utilizes components capable of converting the NIR energy of the filtered signal 20 to an electronic signal, such as performed by charge-coupled devices (CCDs) or equivalent elements. In other embodiments, the illumination signal 16 may be of other wavelength(s) including those of visible light, and in some cases it may be possible to dispense with the separate transducer subsystem 22, as for example through the use of direct view optics.

Figure 2:
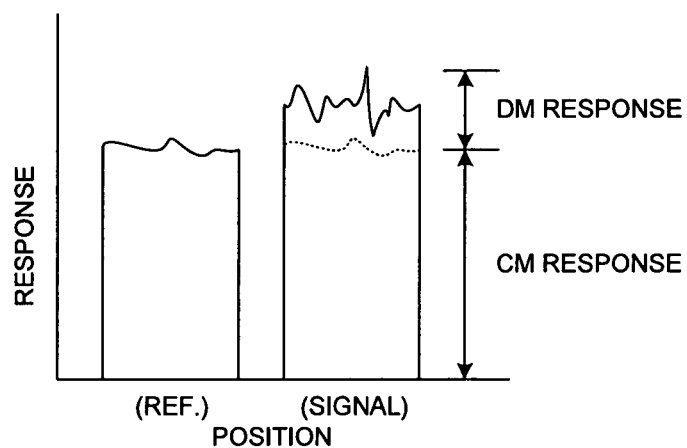
FIG. 2 is a plot illustrating common-mode response and differential-mode response of an array of optical elements in the system of FIG. 1.

FIG. 2 is a line graph representing an important characteristic of the array 12. It includes both signal elements (SIGNAL) and reference elements (REF) that are configured to provide both a common-mode (CM) thermo-optic response as well as a differential-mode (DM) thermo-optic response. "Thermo-optic response" in this context refers to an optical characteristic capable of imparting some form of modulation to the illumination signal 16. The type of thermo-optic response will depend on the type of element employed; specific examples of elements and configurations are provided below. The graph of FIG. 2 illustrates the respective responses of the reference and signal elements as a function of position (represented on a single axis for convenience; generally position may be 0-, 1-, 2- or even 3-dimensional). The reference elements are shown as having a spatial response, which is caused by ambient thermal conditions or other such common input condition across the array 12. The signal elements are shown as having a somewhat different spatial response that is the sum of two distinct components: (1) a CM response to common input conditions that is ideally identical to the response of the reference elements, and (2) a DM response that is ideally a function purely of the thermal signal 10.

Returning to FIG. 1, the composite optical signal 18 includes both a CM signal component as well as a DM signal component, which are created by the interaction between the illumination signal 16 and the CM and DM responses of the array 12, respectively. The optical readout system 14 filters or otherwise generates the composite signal 18 to extract the DM signal component, which represents the thermal signal 10, for utilization by the transducer subsystem 22 or other element in alternative embodiments.

Figure 3:
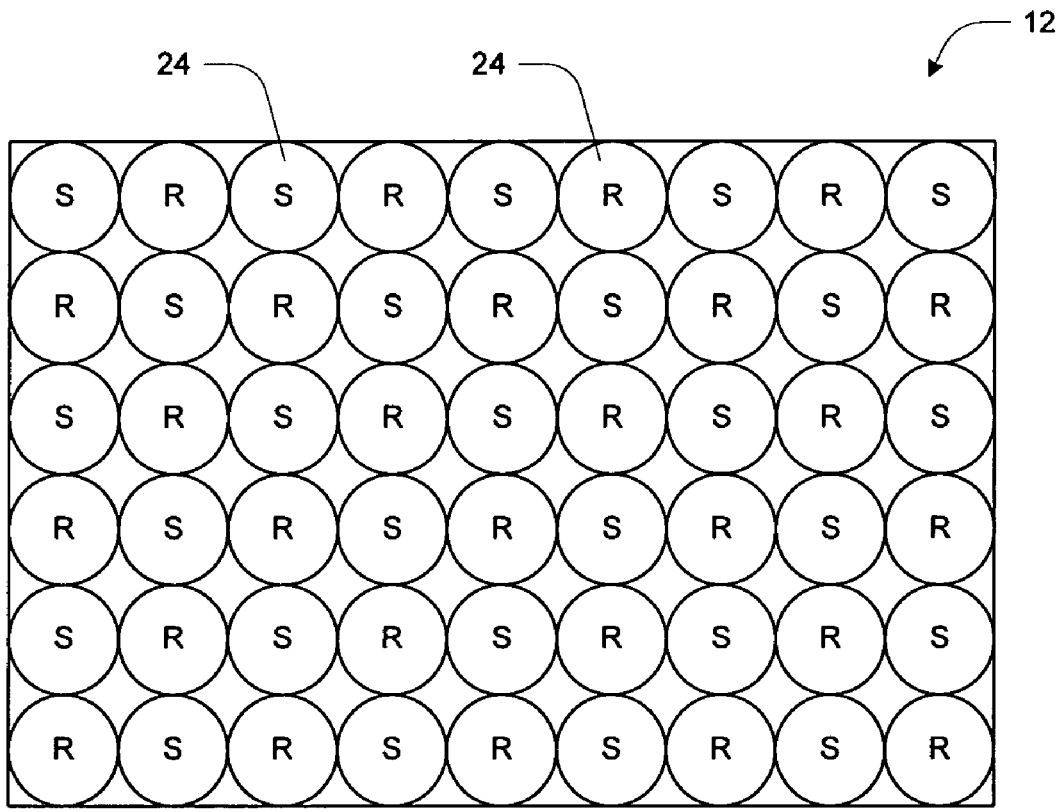
FIG. 3 is a schematic representation of an array of optical elements in the system of FIG. 1.

FIG. 3 provides a schematic representation of an array 12, specifically a 2-dimensional array that can be used in thermal imaging applications for example. In the illustrated embodiment, the array 12 has a 2-dimensional array of optical elements 24, which are divided into signal elements S interspersed with reference elements R. As described above, it is desirable that the signal elements S and reference elements R be configured to provide a common-mode response to common input conditions and major manufacturing variations and nonuniformities. Thus the signal elements S and reference elements may be identical in overall construction, and may be either interspersed (such as shown) or otherwise arranged to achieve the desired common-mode response.

Generally, it is desirable that each signal element S be located close to one or more associated reference elements R such that they experience substantially the same local input conditions (herein still referred to as common input conditions) even as those conditions vary across the array 12. In such a manner, the reference elements R and signal elements S may then contain local common mode input signals due to localized variances in not only ambient temperature but also local variations in element design, manufacturing tolerances, readout illumination and other such parameters as may give rise to input signals other than those due to thermal signal 10.

The elements 24 are shown as circles only for convenience of description; other shapes of the signal elements S and/or the reference elements R may be utilized. The elements 24 may be completely separate physical elements, or they may be interconnected in some manner that provides a desired degree of individual per-element response. In one embodiment, at least the reference elements R are actually separate areas of a single physical element, which can have advantages of manufacturability for example. Specific examples are discussed below. In another embodiment, the reference elements R and signal elements S are substantially identical except for the interface to the thermal signal, thereby generating a substantially identical common mode signal.

Figure 4:
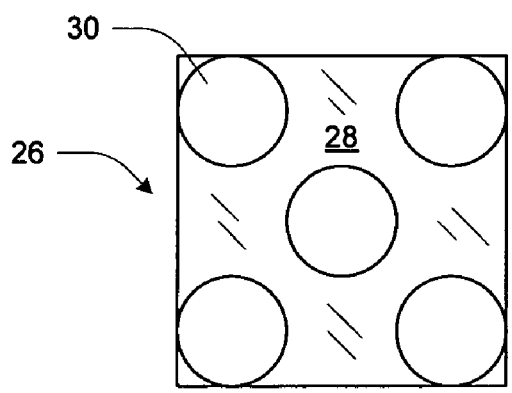
FIG. 4 is a schematic representation of a mask that can be utilized with the array of FIG. 3.

FIG. 4 shows a mask 26 that may be utilized with an array 12 such as that of FIG. 3 to create the desired differential-mode response. The mask 26 includes a thermally opaque substrate 28 with thermally transmissive openings 30 and is located to intercept thermal signal 10. It can be placed in registration with the array 12 such that the openings 30 are aligned with the signal elements S, leaving the reference elements R covered by the opaque substrate 28. With this configuration, the thermal signal 10 can reach the signal elements S but not the reference elements R, resulting in the desired differential-mode response to the thermal signal 10. It will be appreciated that the illustrated mask 26 is but one of many types of elements and/or configurations that may be utilized for the purpose of creating the differential-mode response. Fundamentally, whatever structure is used should direct the thermal signal 10 towards the signal elements S while keeping it away from the reference elements R, or to thermally ground reference elements R while maintaining signal elements S with a thermal isolation to ground. The structure may be realized as a separate element such as mask 26, or be part of the construction of the optical elements 24 themselves.

Figure 5:
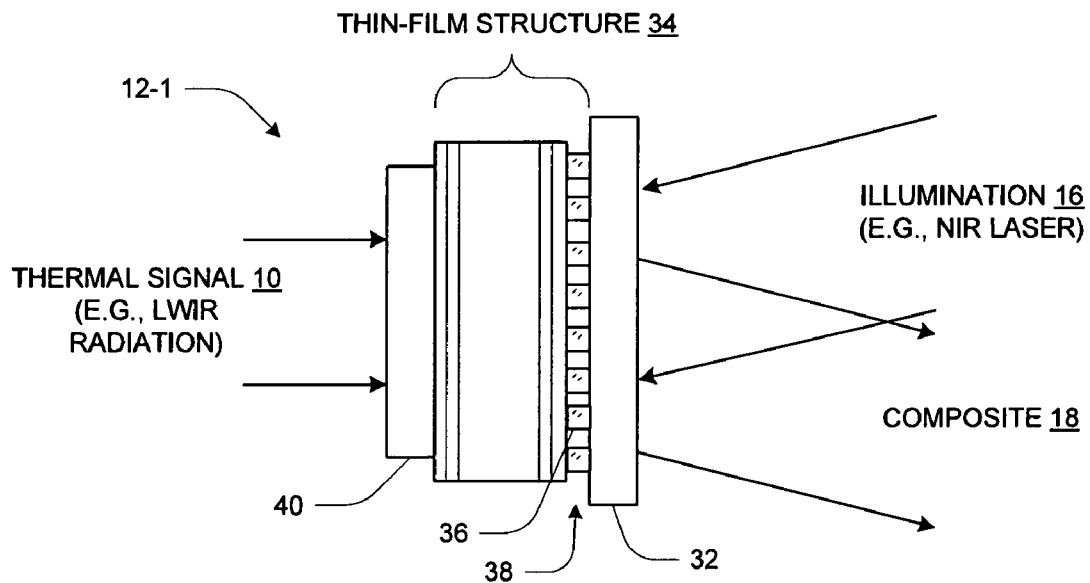
FIG. 5 is a schematic cross-sectional representation of a thin-film optical element.

FIG. 5 shows a cross-sectional view of a specific kind of array 12-1 utilizing thin-film technology, referred to herein as "thin-film array" 12-1. The thin-film array 12-1 may have the general 2-dimensional form shown in FIG. 3, for example, but in alternative embodiments it may be either a linear array or even a single "pixel" (with CM and DM responses). It will be appreciated that for most practical 2-dimensional arrays, the thickness of the thin-film array 12-1 is one or more orders of magnitude thinner than its surface length/height/width. Thus for such an array the view of FIG. 5 should be seen as distorted in the horizontal direction in order to show pertinent detail.

Specifically, the thin-film array 12-1 includes a flat plate substrate 32 of a material that is transparent at the frequency of the illumination signal 16, such as glass or fused silica in the case of NIR illumination for example. The outside surface (rightmost in FIG. 5) may be coated with an anti-reflective coating. An optical thin-film structure 34, such as that described in US 2007/0023661 is formed on the inner surface of the substrate 32. The thin-film structure 34 functions as a mirror whose reflectivity (or other optical property) is a function of temperature, which in turn is influenced by the thermal signal 10. The thin-film structure 34 includes supports 36 that maintain a spacing 38 for spacing between the optical elements 39 of the thin-film structure 34 (described below with reference to FIG. 6) and the substrate 32. Attached to the other surface of the thin-film structure 34 is an input interface layer 40 that serves to absorb the thermal signal 10 (e.g. LWIR radiation) for the signal elements of the thin-film structure 34.

Figure 6:
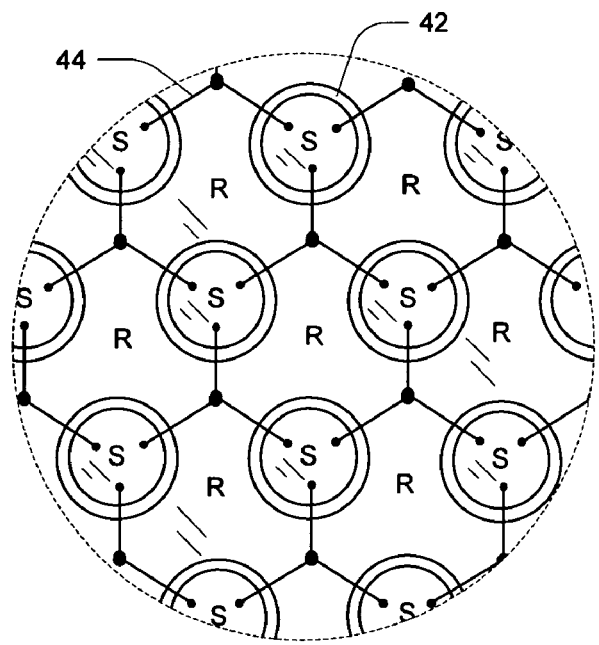
FIG. 6 is a schematic plan representation of an array of thin-film optical elements.

FIG. 6 illustrates the thin-film structure 34 in plan view seen from the direction of the thermal signal 10. Signal elements S are island-like sections of the thin-film structure 34.

The signal elements S are separated from the surrounding reference areas R by gaps 42, and attached to the surrounding reference areas R by thermally isolating support arms 44. It will be observed that the reference areas R are all part of one contiguous sheet of thin-film material such that nonuniformities in the material are reflected substantially equally in the signal elements S and reference area R. The thin-film structure 34 can be formed using layering and etching techniques generally referred to in the art as micro-electrical-mechanical systems (MEMS) technology. In the illustrated embodiment, the signal elements S and reference areas R are at one point in the manufacturing process constituted by the same set of layers of material with sacrificial material surrounding the array elements, and this sacrificial material is subsequently removed by chemical etching to form the gaps 42. Thus the signal elements S are substantially identical to the reference areas R, providing for the above-described common-mode response to ambient thermal conditions. The operation of the array 12-1 including thin-film structure 34 is described below.

Figure 7:
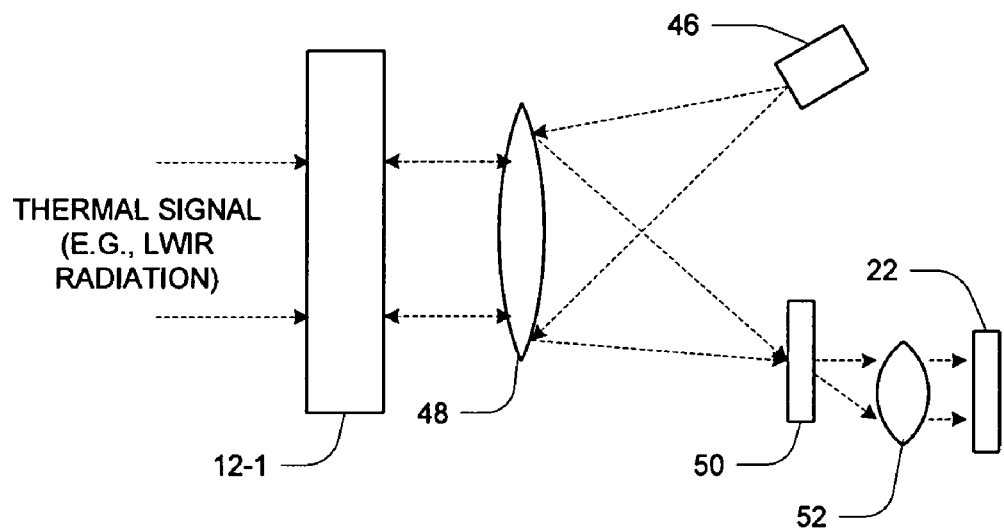
FIG. 7 is a block diagram of a thermal imaging system according to an embodiment of the invention.

FIG. 7 shows a thermal imaging system that utilizes the array 12-1 described above. An light source, for example NIR laser 46, generates a diverging NIR beam which impinges on a lens 48, which collimates the beam and directs it to the array 12-1 as the illumination 16 (FIG. 1). The light reflected from the array 12-1 (which is the composite signal 18 of FIG. 1) is converged by the lens 48. In the focal plane is placed a filter 50, whose structure and operation are described below. Beyond the focal plane (where the light is diverging), an additional lens 52 is placed to collimate the light and direct it to a transducer subsystem 22 for example.

Figure 8A:
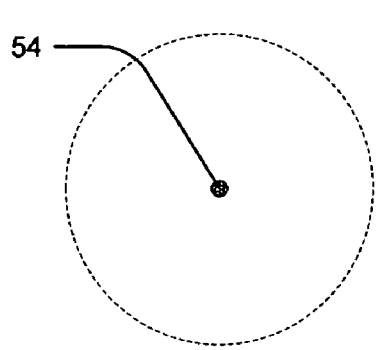
FIGS. 8(a) and 8(b) are schematic representations of components of a composite image in the system of FIG. 6.

FIG. 8 illustrates patterns of light that appear in the focal plane of the lens 48. FIG. 8(a) illustrates the pattern that appears when there is no thermal signal 10 present, such that only the common-mode component of the composite signal 18 is present. In this case, the thin-film structure 34 of the array 12-1 functions substantially as a plane mirror, with the signal elements S and reference areas R responding only in their common-mode fashion. Light from the array 12-1 is focused to a single common-mode focal image 54. It will be appreciated that the common-mode focal image 54 is of relatively high intensity, capturing as it does the "baseline" thermo-optic response of the signal and reference elements (described in more detail below).

Figure 8B:
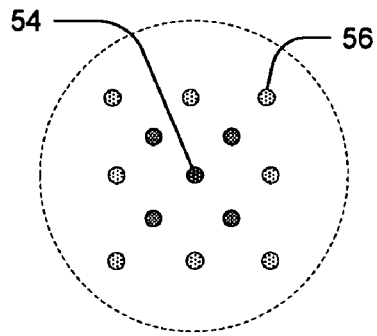

FIG. 8(b) illustrates a set of patterns that appear when there is a non-zero thermal signal 10 present. In this situation, the signal elements S of the thin-film structure 34 have a different reflectivity than do the surrounding reference areas R, and this difference gives rise to diffraction effects in the composite signal 18 reflected from the array 12-1. There is still the common-mode focal image or component 54, and also several differential-mode images or components 56 which are spaced apart by an amount corresponding to the spacing of the signal elements S of the array 12-1. The pattern in FIG. 8(b) can be viewed as a spatial Fourier transform of the composite image 18 generated by the array 12-1.

Figure 9:
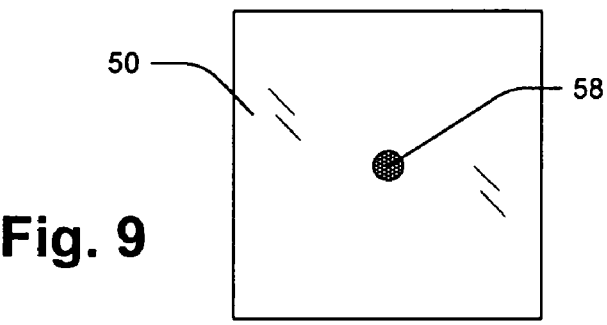
FIG. 9 is a diagram of a spatial Fourier filter utilized in the system of FIG. 7.

FIG. 9 shows the filter 50. It is sheet of material that is generally transparent at the NIR wavelength of the laser 46, with a central NIR-opaque area 58 that serves to block the common-mode component 54 while permitting the differential-mode components 56 to pass. Other types of spatial patterns may be also be used this filtering, such as a filter that passes on a single first diffraction order. A single first order passing filter may be advantageous in reducing unwanted signals from features in the array at different spatial frequencies.

Figure 10A:
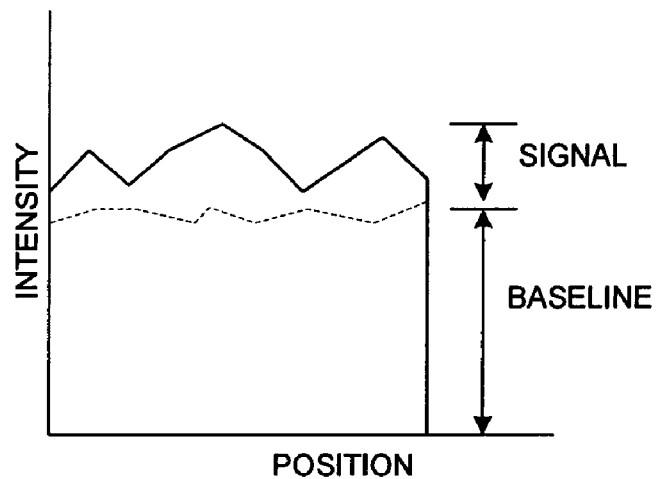
FIGS. 10(a)-10(c) are plots of intensity versus position for images in the system of FIG. 7
Figure 10B:
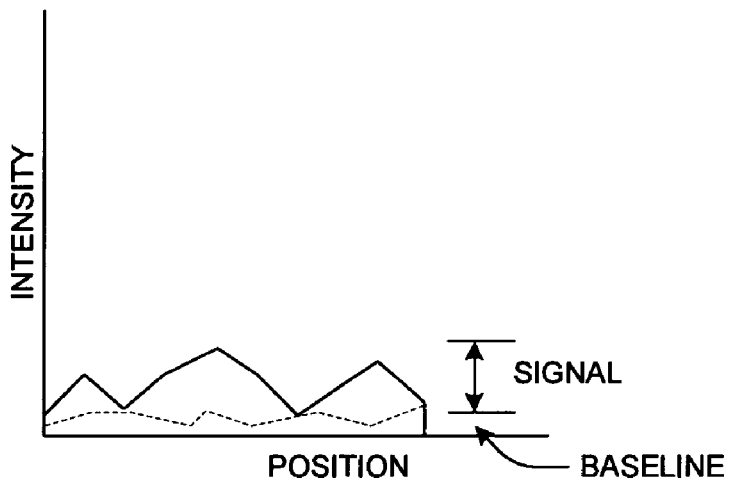
Figure 10C:
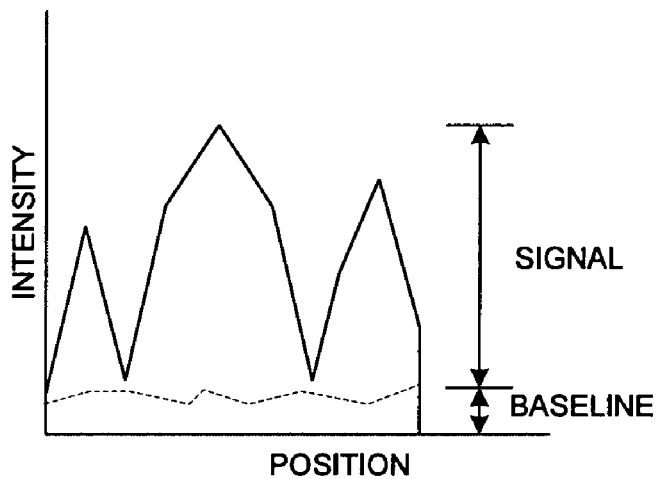

FIG. 10 illustrates the benefit of the self-referencing approach described herein. FIG. 10(a) shows the response of signal elements of optical elements 24, which include a baseline response to ambient thermal conditions and manufacturing nonuniformities as well as a signal response to the thermal signal 10. As shown, in array 12-1, the amplitude of the signal response is generally much smaller than the amplitude of the baseline response. This can be viewed as a low-contrast signal, i.e., with very little difference between the highest-temperature and lowest-temperature parts of the thermal signal relative to the size of the baseline signal. The transducer subsystem 22 has only limited capacity in terms of intensity measurement, which could be represented by a vertical line near the top of FIG. 10(*a*), and thus much of the measurement capacity is utilized simply to capture the baseline rather than the signal of interest. If this signal were converted to a visible image, it would be mainly uniform white, with small variations that only faintly trace the thermal image represented by the thermal signal 10. In addition, the baseline signal generates noise, resulting in a reduced signal to noise ratio and therefore reduced image quality and reduced sensitivity to thermal signal 10.

FIG. 10(*b*) shows the result when the common-mode component of the composite signal 18 is removed, such as in the manner described above. In this situation the amplitude of the signal response is much larger relative to the remaining baseline, and the signal-to-noise ratio and contrast are improved. Signal-to-noise can be further enhanced by increasing either the intensity of the illumination signal 16 or the exposure in the transducer subsystem 22. This is illustrated in FIG. 10(*c*)—the signal amplitude is increased to utilize a much greater proportion of the display capacity. This provides improved performance even in the presence of shot noise in the transducer subsystem 22. Shot noise increases as the square root of the number of photons captured, whereas the signal increases linearly, and thus an increase of exposure by 4× provides for a 2× improvement in signal-to-noise ratio. The visible image corresponding to the signal of FIG. 10(*c*) will have a much more distinct rendering of the thermal image represented by the thermal signal 10.

Figure 11:
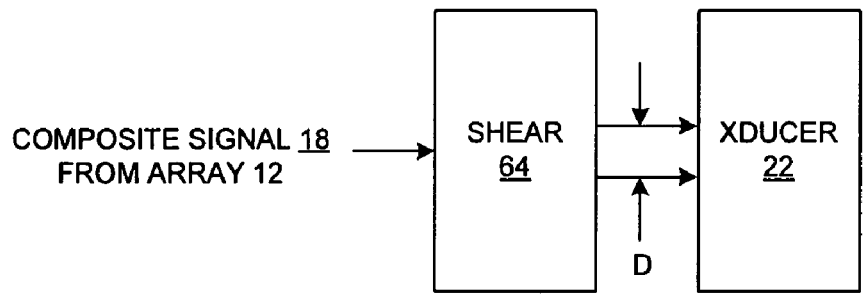
FIG. 11 is a functional block diagram of a further embodiment.

FIG. 11 is a functional block diagram illustrating an method of performing optical readout that is an alternative to that described above with respect to FIGS. 7-9. In this approach, the array 12 operates to modulate the phase of the illumination 16, and thus common-mode and differential-mode components of the composite signal 18 are phase components. The composite signal 18 is applied to a shear module (SHEAR) 64 whose output is provided to a detector module (DETECTOR) 66. For clarity, the method is shown in one dimension only. In this embodiment, the array 12 can be viewed as a "phase object", i.e., an object which primarily modifies the optical phase of light transmitted through or reflected from the object, typically with some spatial variations across the object. Any variations in optical intensity imparted on the wavefront are considered incidental. A thin-film structure such as shown in FIG. 5 above can be utilized as a phase object.

Equivalently operating in either transmission or reflection, shear module 64 accepts the composite signal 18 as a single wavefront, or beam, of light and creates a pair of replicated wavefronts which are displaced ("sheared") laterally from each other by a predetermined distance D. The distance D is chosen such that the light from any given signal element S of the array 12 coincides with (i.e., become co-located with) the light from a corresponding reference element or region R (see FIG. 3 above). The pair of coincident beams propagate away from shear module 64 and impinge on the detector module 66. The detector module 66 is designed to have one or more light sensitive pixels aligned with each impinging pair of beams corresponding to a given signal element S. Because the source is partially coherent, the intensity detected by each pixel is the coherent interference between the light coming from the signal element S and the light coming from its reference region R. Under ambient conditions in which a thermal signal 10 is not present, the interference is ideally 100%, and thus there is no output from the detector module 66 (this corresponds to the common-mode signal component). The presence of the thermal signal 10 causes the interference to be less than 100%, and thus there is corresponding output from the detector module 66 (this corresponds to the differential-mode signal component). When the optical property being utilized is refraction, variation of the index of refraction of the signal element S based on response to thermal input causes the intensity of the interference to change in accordance with the well known raised cosine formula.

As described below, there are multiple ways to embody shear module 64. For example, a diffractive optical element may be used to generate two primary orders. Alternatively, polarization components such as a block of calcite can be used to generate the image using the Differential Interference Contrast technique (or modification thereof). In yet another approach, most two beam interferometers can be aligned to introduce shear with little or no delay and are therefore suitable. In yet another embodiment, both shear and a linear phase difference between the two interfering beams may be employed; this latter embodiment introduces a spatial carrier frequency (viz., a fringe pattern) onto the interference pattern seen by the detector array.

Figure 12:
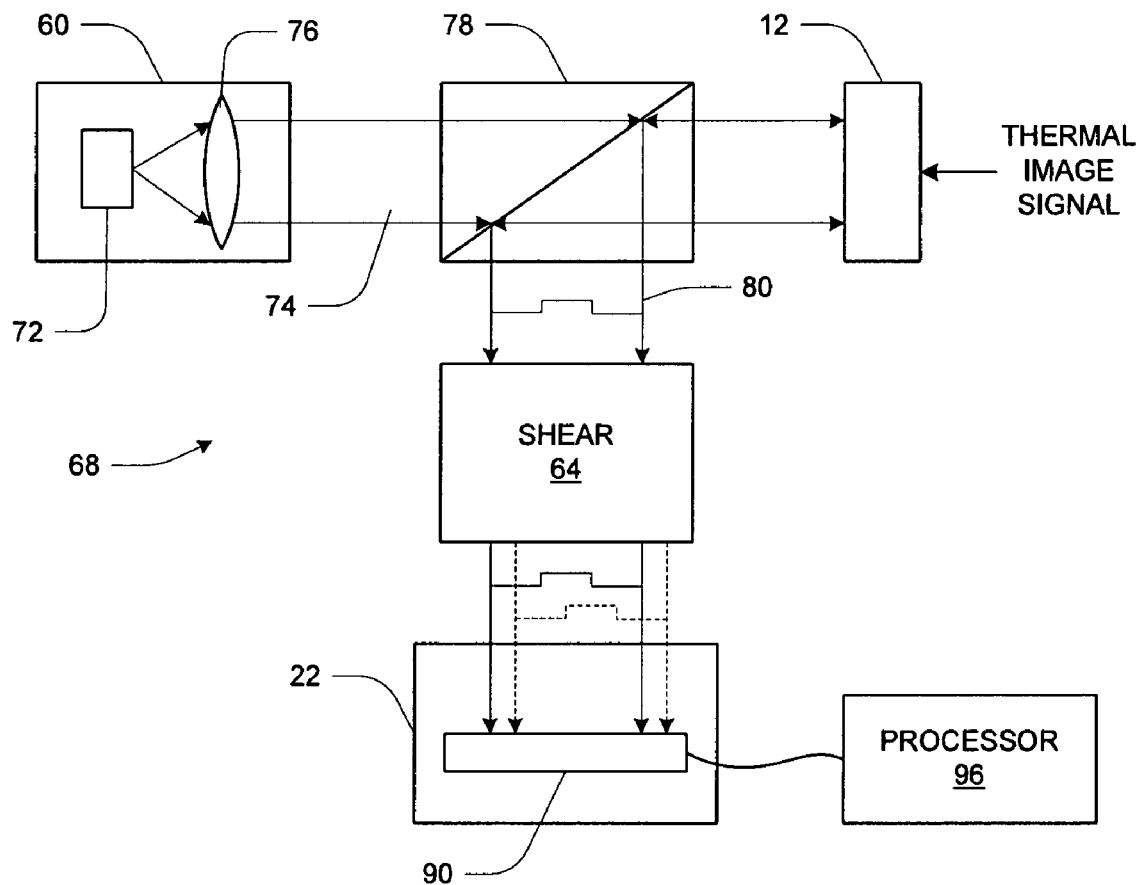
FIG. 12 is a schematic diagram of a further embodiment.

FIG. 12 is a schematic representation of an apparatus to embody the method illustrated in FIG. 11. As illustrated, the imaging system 68 comprises a source module 60, a shear module 64, and an image detector module 66. A source 72 of visible or near infrared (NIR) radiation emits light, typically into a cone of known numerical aperture. Source 72 is partially coherent, both spatially and temporally (that is, the source has a small emitting aperture and a narrow wavelength emissions band). Preferably source 72 is a diode laser or LED.

The expanding cone of light is converted into a generally collimated beam 74 by collimator 76, typically a refractive lens. After passing through a beam splitter 78 the collimated light impinges upon the array 12, which is configured with signal elements S and reference elements or regions R as shown above in FIG. 3. As shown for clarity, the array 12 may be back illuminated by, say, a thermal image signal, whereby the local index of refraction in each signal element S is modified by the optical power in the thermal image in that local area. The reference regions R are thermally isolated from the thermal image and thus have local indexes of refraction related to the ambient conditions.

Preferably, collimated beam 74 penetrates into and is reflected from array 12, during which transit localized regions of collimated beam 74 are modulated by array 12. Although FIG. 12 depicts a reflective configuration, one of ordinary skill in the optical arts will recognize the equivalence of a system in which array 12 is transilluminated. The now modulated beam, propagating away from array 12, impinges upon the beam splitter 78 for a second time. At least a fraction of the modulated beam is directed by the beam splitter toward shear module 64 as beam 80.

Figure 13:
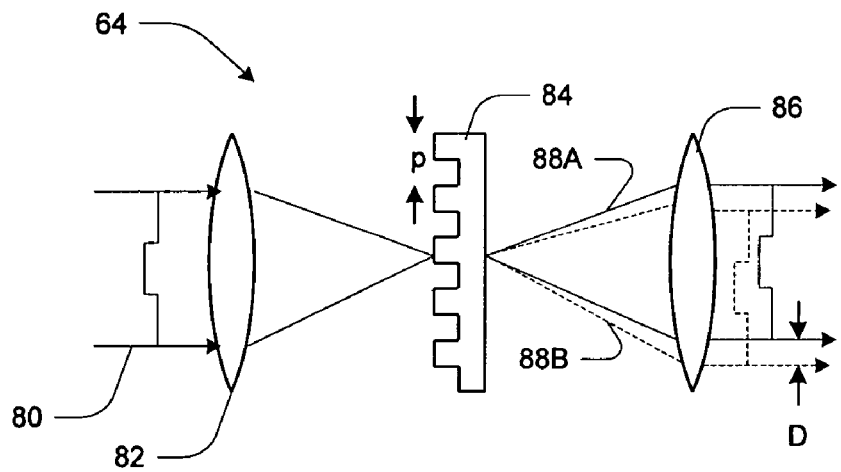
FIG. 13 illustrates a diffractive embodiment of a shear module.

Shear module 64, in one embodiment shown in FIG. 13, comprises a focusing element 82, a diffractive optical element (DOE) 84, and a re-collimating optical element 86. As illustrated, this shear module embodiment operates by focusing an incoming, quasi-collimated beam 80 into the plane of DOE 84. In a preferred embodiment, DOE 84 is a phase-only, 50:50 duty cycle diffraction grating in which the peak-to-valley phase delay is substantially ½-wave at the central wavelength of narrowband source 72. It is well known that such a grating has strong $1^{st}$ diffracted orders and substantially zero energy in the $0^{th}$, or undiffracted order. A single, nominally on-axis focused beam 80 impinging on this grating is converted into at least two exiting, diverging beams 88A, 88B traveling respectively in the +/-$1^{st}$ order directions (viz., at an angle λ/p, where λ is the central wavelength of source 72 and p is the period of DOE 84). Diverging beams 88A, 88B reach re-collimating optical element 86 where they are converted into laterally displaced replicas of the original incoming beam 80. The lateral displacement, D, is just twice the product of the diffraction angle and the focal length of re-collimating element 86.

In FIG. 13 incoming beam 80 is illustrated with a single, square "bump" representing the phase modulation caused by a single signal element S. As suggested in the Figure, the grating period and re-collimating element focal length are designed to set D greater than or equal to the width of the signal element S in the direction of displacement. At that distance, the bump from the signal element S is displaced fully onto the nominally flat wavefront reflected from the adjacent reference region R. D must also be less than or equal to the width of the reference element R.

Referring again to FIG. 12, the two overlapping beams leaving shear module 64 propagate to detector module 66. The detector module 66 comprises, at a minimum, one light sensitive detector element for each signal element S being imaged. Preferably, detector module 66 includes a detector array 90 comprising many individual elements, each element typically smaller than an signal element S, eliminating the need for custom detector arrays or careful alignment. Preferably detector array 90 is a CMOS array. Alternatively, the array is a CCD, scanned photodiode array, or other array detector sensitive to the wavelength emitted by source 72.

In some embodiments the detector module 66 also comprises one or more relay imaging optics. These optics match the scale and image plane location to the particular detector array 90 or a desired packaging design. The relay optic is designed or selected in accordance with well known principles of the optics art.

Figure 14:
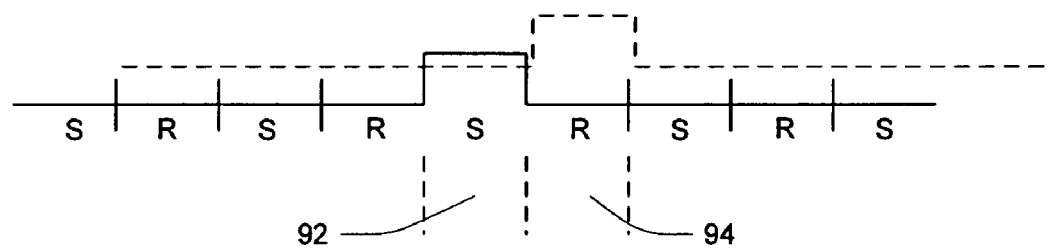
FIG. 14 schematically illustrates two sheared wavefronts.

As shown in FIG. 14, in one embodiment the image is detected only in a first region of interference 92, where said region is defined as the location where a particular signal element S (e.g. signal element S1) in beam 88A overlaps with an adjacent reference region R in beam 88B. In another embodiment, the image is detected both in the first region of interference 92 and in a second region of interference 94, where said second region is the location where signal element S1 in beam 88B overlaps with the adjacent reference region R from beam 88A. It should be noted that the two reference regions R mentioned are located diametrically across from one another, relative to the signal element S.

In either embodiment, the signal detected is related to the phase difference between light from the signal element S and light from the reference region R by the well known interference formulae. As is generally known, the intensity, I, on the detector is of the form $$I \propto 1 + COS(\Delta) \qquad \text{Equation 1}$$

where $\Delta$ is the phase difference. Typically, this intensity is displayed as the result of the imaging method. Preferably, the display for this image comprises only the signals coming from detector elements onto which light from the signal element S has been imaged. Note that the range of this readout method is limited to $\pi$ radians by the inherent ambiguity of the cosine function. In a typical system one would add a phase bias to signal or reference element such that one does not experience an inversion (ambiguity) over the desired range of operation. In most cases it is useful also to add roughly $\pi$ radians phase offset in order to have low (or no) power in the filtered signal 20 in the case where there is only a common-mode response, in order to generate maximum contrast for small differential signals.

Referring again to FIG. 12, the signals from detector 66 are transferred to an electronic processor 96 wherein the image, or information, extracted is processed or modified in accordance to a pre-determined algorithm.

Figure 15:
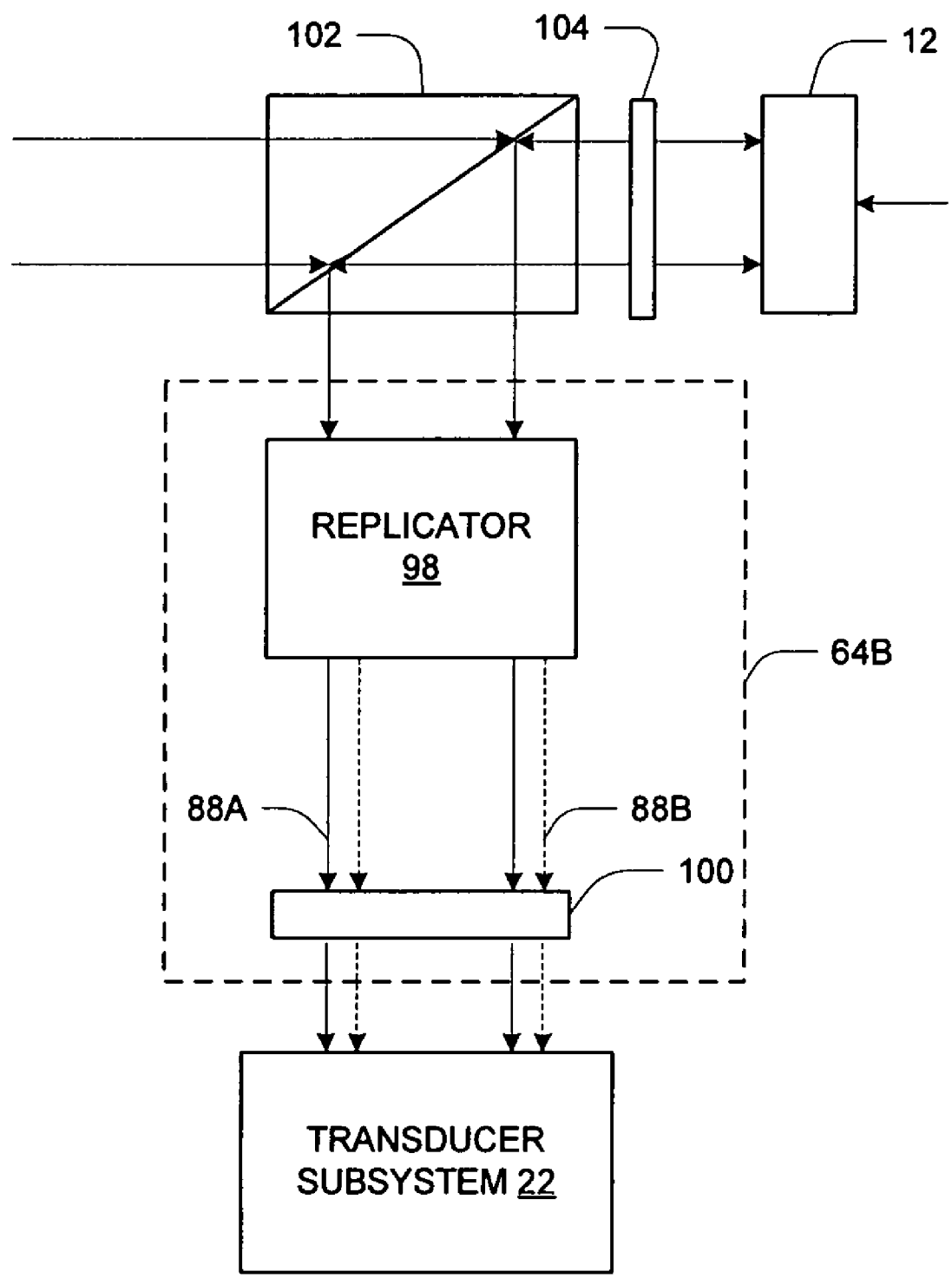
FIG. 15 illustrates a polarization shear embodiment of a shear module.

FIG. 15 illustrates another embodiment, in which a shear module 64B uses polarization sensitive components to implement the displacement of the wavefronts. The modulated wavefront returning from array 12 is directed through a polarization beam replicator 98 that creates the requisite sheared, replicated beams 88A and 88B. As these two beams are orthogonally polarized, they are passed through a polarizer 100 whose axis is oriented at substantially 45 degrees to the polarization directions of the two beams before being transmitted to detector 66.

Figure 16:
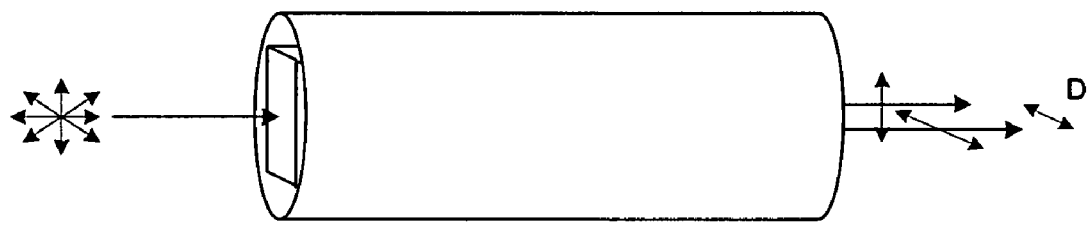
FIG. 16 shows an example of a polarization beam replicator.

Polarization beam replicator 98 can be created in many ways. In one embodiment, the replicator 98 is a block of calcite. FIG. 16 shows a commercially available "Beam Displacer", OptoSigma part number 066-5550. Although called a beam displacer by this vendor, in reality this simple calcite element separates the o-ray and the e-ray into two laterally displaced beams of orthogonal polarization, as is well known in the optics art, i.e., it produces two sheared replications of the input beam. The "beam displacer" creates two beams of equal intensity under two conditions: when the input is unpolarized and when the input is polarized at 45 degrees to the displacer's designated axis. It appears to be preferable to operate with polarized light.

Returning to FIG. 15, in the illustrated embodiment a polarizing beam splitter 102 is used in place of beam splitter 78 of FIG. 12, the beam splitter oriented to transmitted light polarized in the plane of the figure. A quarter-wave plate 104 is located between polarizer 102 and array 12. The quarter wave plate 104 acts, generally, to convert linearly polarized light into circularly polarized light. In accordance with well known physical optics theory, circularly polarized light reflected from array 12 changes "handedness". When this reflected light passes back through quarter-wave plate 104 it is re-converted into linearly polarized light, but with a plane of polarization rotated 90 degrees from the original; that is, the reflected light reaches beam splitter 102 with a plane of polarization perpendicular to the plane of the figure. This light is reflected by beam splitter 102 and directed to shear module 64B.

As described previously, shear module 64B comprises a polarization beam replicator module 98 and a linear polarizer 100. Beam replicator module 98 affects light differently depending on its polarization state. Generally two orthogonal polarization states are defined relative to a physical axis in the beam replicator; the ordinary ray and the extraordinary ray. Depending on the specific design used (e.g., Wollaston Prism, Nomarski Prism, Glan-Thompson prism) the ordinary and extraordinary rays are separated laterally, angularly, or both. Of course, with appropriate fore and aft optics any angular separation can be converted into a pure lateral separation.

Figure 17:
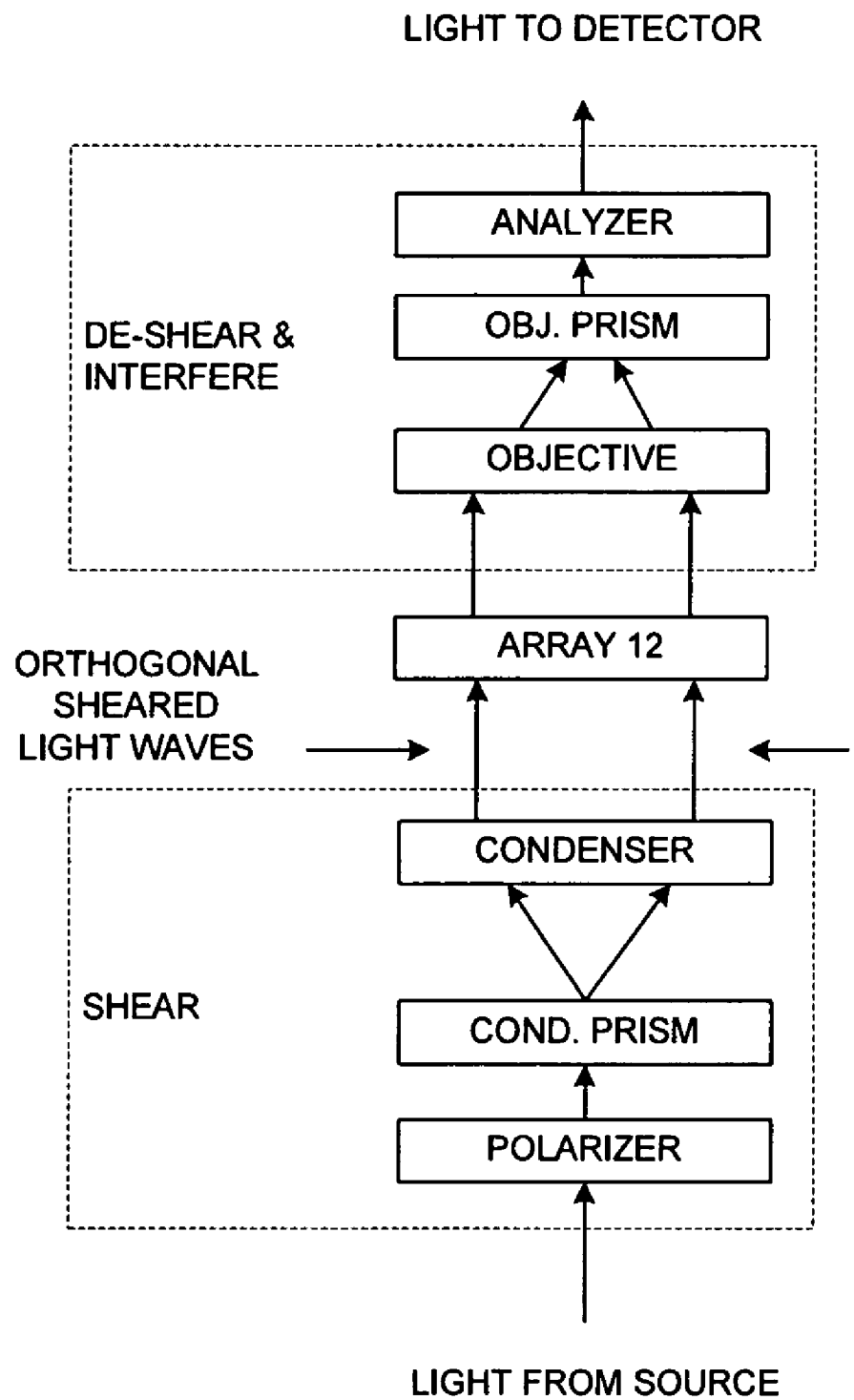
FIG. 17 is a schematic diagram of the differential interference contrast principle.

In one simple design, a plain block of calcite such as shown in FIG. 16 is used. This embodiment is suitable for use with a partially coherent (spatial and temporal) source, wherein two separated parts of the wavefront will interfere. For an extended source (e.g., not partially coherent) a Nomarski configuration, as shown schematically in FIG. 17, is utilized.

In this latter configuration a single section of wavefront is divided into two displaced beams by the shear module, passed through the phase object, and then "de-sheared" by a second shear module. The de-shearing action recombines the two copies of the wavefront, allowing interference to be observed.

Figure 18:
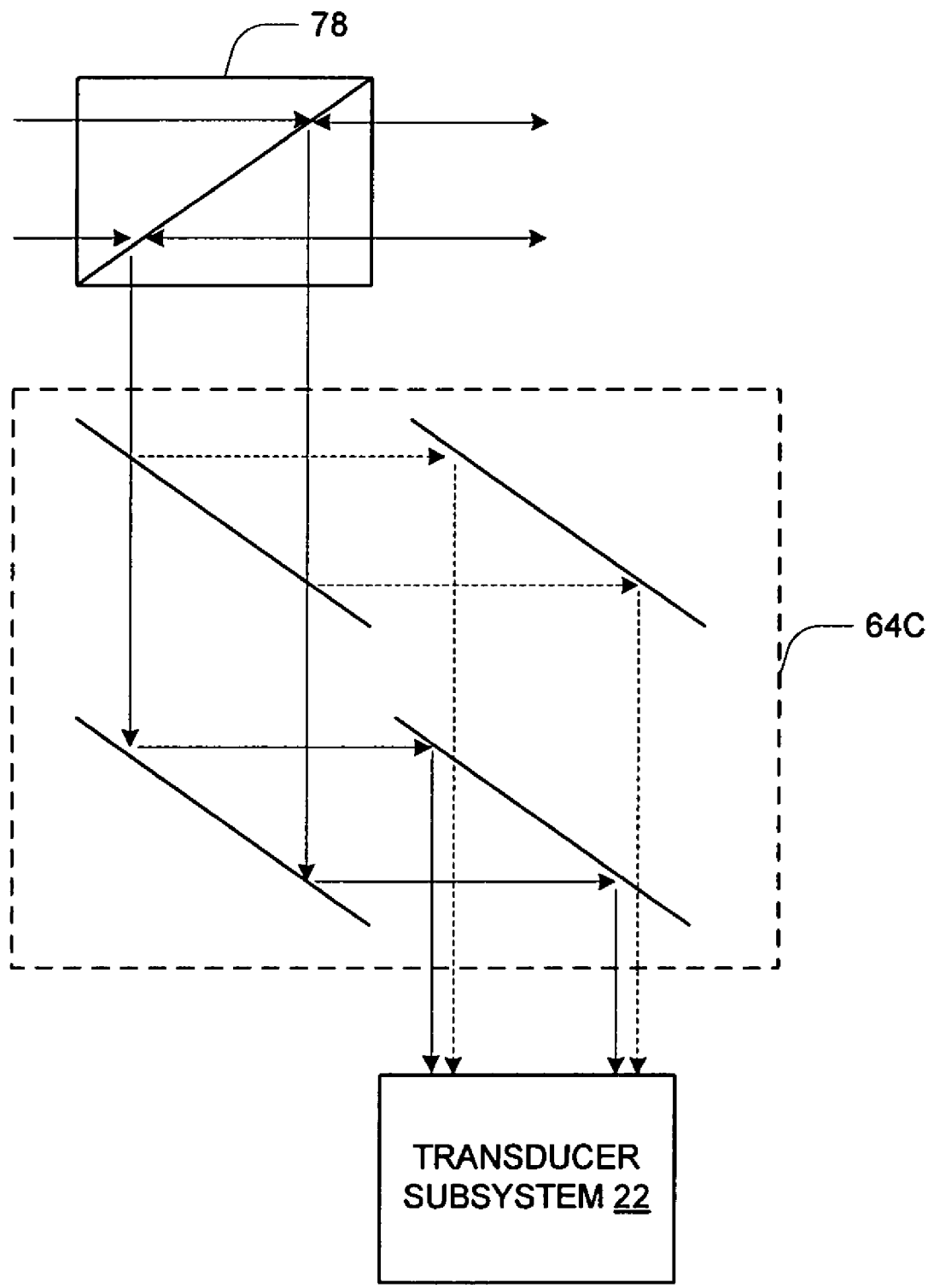
FIG. 18 illustrates a bulk optics embodiment of a shear module.

A third embodiment for the shear module is illustrated in FIG. 18. It is well known that most two beam interferometers—Mach-Zehnder, Twyman-Green, etc.—will introduce lateral displacement between the two output beams unless careful alignment procedures are observed. Normally shear is avoided in these interferometers because the shear makes phase errors in the illumination beam visible. However, in this embodiment lateral shear is desired. The introduction of shear into a two beam interferometer is well known in the optical testing art and need not be described in detail here.

All of the heretofore described embodiments generate substantially identical interference patterns on the face of detector module 66. These patterns represent the conversion of a phase difference to an intensity difference in accordance with Equation 1, above. As has been demonstrated in other applications of interferometry, very accurate estimates of phase differences can be obtained by converting the optical phase difference into a position change of a spatial fringe ("carrier"). For example, this principle has been applied in the field of optical testing (of lens quality) for many years.

Figure 19:
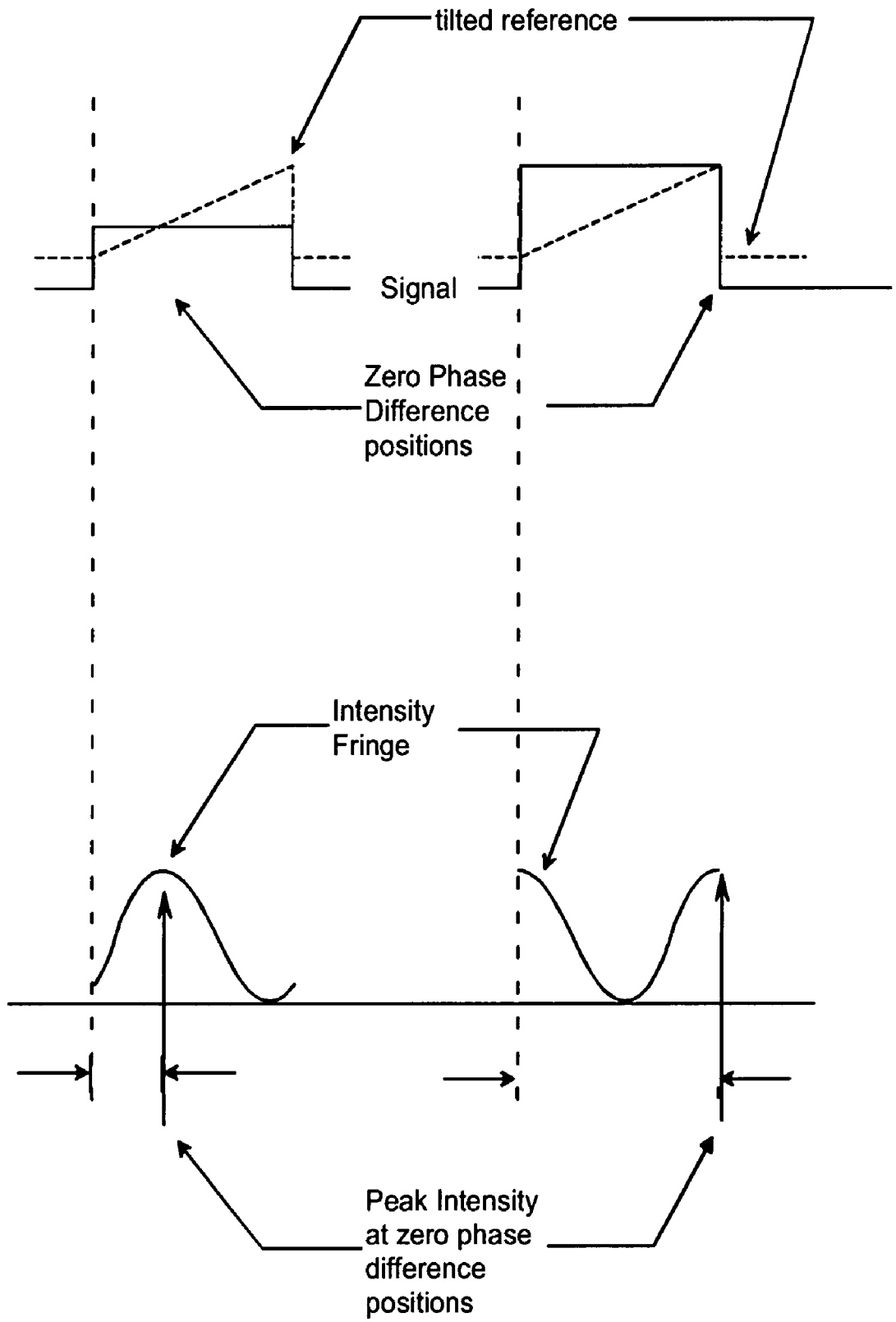
FIG. 19 illustrates the use of a spatial carrier fringe.
Figure 20:
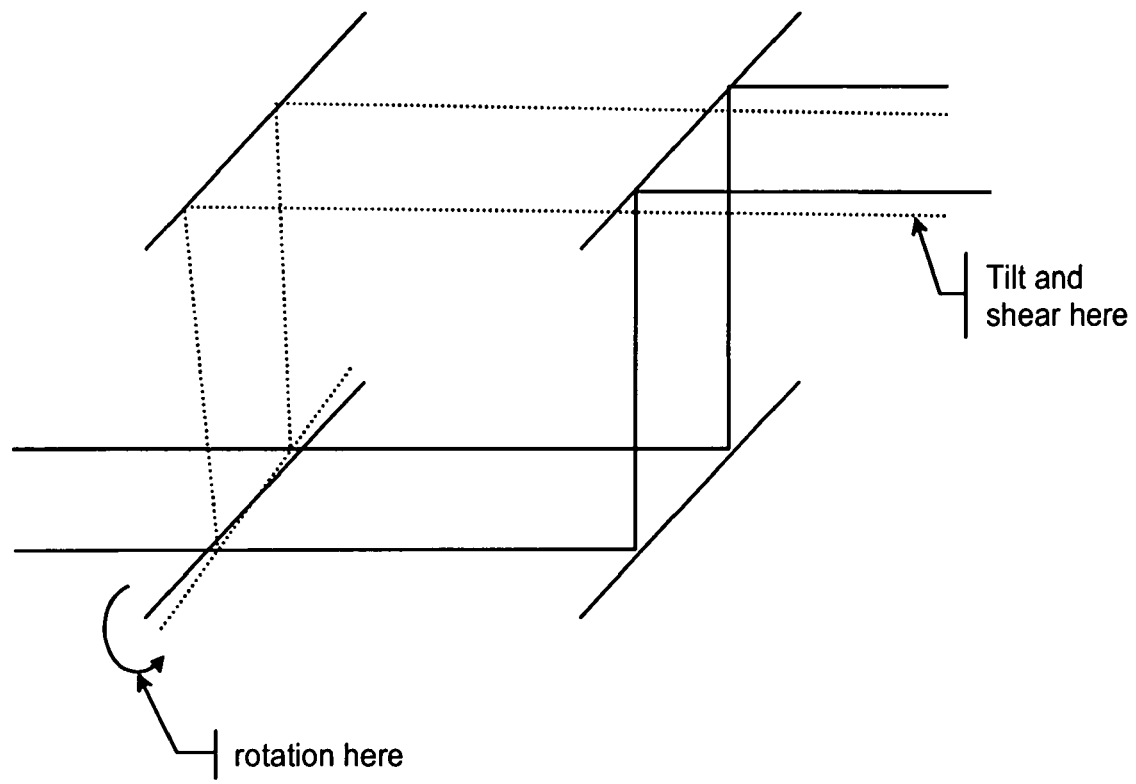
FIG. 20 illustrates the generation of a spatial carrier fringe.

FIG. 19 illustrates the principle. A spatial carrier fringe is created when there is tilt between two interfering wavefronts. The position of the carrier fringe, as represented by, say, the peak intensity of the fringe, is determined by the phase difference between the interfering beams. A spatial carrier can be created in shear module 64 by adding a net wavefront tilt between the two laterally sheared wavefronts. Such tilt can be incorporated into any of the three previously described embodiments. For clarity, FIG. 20 illustrates the simple alignment change needed to add a carrier frequency to the two beam interferometer embodiment of shear module 64C.

It must be noted that the use of the spatial carrier approach requires additional detectors in each signal element S and more complex electronic processing. In its most basic form, the output intensity in the image of one signal element S is $$I \propto 1 + \cos(k_x x + \Delta) \qquad \text{Equation 2}$$

where $k_x$ is the spatial frequency of the carrier fringe and x is the spatial variable. The processing system is designed to extract $\Delta$ from this cosine intensity variation.

As is well known, a minimum of three samples values from this fringe are required to estimate the phase difference. For more convenient processing, four samples (nominally every ¼ cycle) are obtained from each fringe. Techniques for four-bin processing are known in the art.

It will be noted by one skilled in the art of optical instrument design that the above descriptions of the embodiments have, for clarity, left out various pupil relay optics well known to be needed in practical instruments. For example, these optics, typically, are used to image the surface of array 12 onto the face of detector module 66.

While various embodiments of the invention have been particularly shown and described, it will be understood by those skilled in the art that various changes in form and details may be made therein without departing from the spirit and scope of the invention as defined by the appended claims.

For example, in alternative embodiments the thermo-optic system may employ an array 12 that utilizes other types of elements or devices having a thermo-optic response. Alternative thin-film elements may impart phase modulation to the illumination signal 16, or impart modulation by changing their absorption characteristics as a function of temperature, such as in the case of pyro-optic films such as in the devices shown in U.S. Pat. No. 6,766,882. The array 12 may utilize cantilevered mirrors made using MEMS techniques and configured to have the desired differential-mode response to the incident thermal signal 10. Other types of thermally-actuated devices may also be used.

While in the disclosed embodiments the thermal signal 10 is described as incident radiation such as LWIR radiation from a scene to be imaged, in alternative embodiments it may be a thermal control signal generated by some means, such as by an array of heat-generating resistors, and the function of the system is to generate a visible or other display under such control (e.g., the thermal signal is a generated signal representing an image to be displayed). Other potential sources include localized chemical reactions and conductive/convective heating or cooling patterns. The thermal signal 10 need not be two-dimensional—in alternative embodiments it may be one-dimensional or even zero-dimensional (i.e., representing temperature at a single location only).

It is also contemplated that other forms of optical readout subsystems 14 may be employed to generate a differential signal for filtered 20, including in connection with the use of other types of optical elements in the array 12. If phase-modulating elements are used, for example, then an optical readout subsystem capable of detecting phase modulation of the composite image (and separating the phase-modulated CM and DM components thereof) would be utilized.

What is claimed is:

1. Apparatus, comprising:
   an array of optical elements each having a thermally responsive optical property, the optical elements including a signal element and a reference element configured to provide (1) a common-mode response of the optical property to a common input condition and (2) a differential-mode response of the optical property to a thermal signal appearing across the array of optical elements; and
   an optical readout subsystem configured to (1) illuminate the array of optical elements with optical energy at a readout wavelength corresponding to the optical property so as to generate a composite optical signal having common-mode and differential-mode signal components corresponding to the common-mode and differential-mode responses respectively of the signal and reference elements, and (2) generate from the composite optical signal an output optical signal being substantially the differential-mode image component.

2. Apparatus according to claim 1 wherein the output optical signal is generated using a Fourier filter.

3. Apparatus according to claim 1 wherein the output optical signal is generated by spatially combining the common mode and differential mode signals.

4. Apparatus according to claim 3 wherein the spatial combining uses orthogonal polarization components and a polarizing filter.

5. Apparatus according to 3 wherein the spatial combining uses a diffraction grating.

6. Apparatus according to claim 1 wherein the optical elements are thermo-optical in nature.

7. Apparatus according to claim 6 wherein the thermo-optical optical elements use a pyro-optical element whose absorption varies with temperature.

8. Apparatus according to claim 6 wherein the thermo-optical optical elements use a thin film interference filter with at lease one layer whose refractive index changes with temperature.

9. Apparatus according to claim 1 wherein the phase of the composite optical signal is a function of the thermal signal.

10. Apparatus according to claim 1 wherein the signal elements are being heated by optical absorption.

11. Apparatus according to claim 10 wherein the optical absorption is at a first wavelength, and the readout wavelength is at a second wavelength different from the first wavelength.

12. Apparatus according to claim 11 wherein the first wavelength is in the thermal infrared spectrum and the second wavelength is in the visible or near-IR.

13. Apparatus according to claim 10 wherein a thermal source is used to modulate the element temperatures for the purpose of creating a display.

14. Apparatus according to claim 1 where the signal elements are heated by electronic means.

15. Apparatus according to claim 1 where the signal elements are being heated by chemical/biochemical means.

16. Apparatus according to claim 1 where the signal elements are heated by conductive means.

17. Apparatus according to claim 1 where the signal elements are heated by convective means.

18. Apparatus according to claim 1 wherein the array of optical elements is two-dimensional.

19. Apparatus according to claim 1 wherein the signal elements are interspersed with the reference elements.

20. Apparatus according to claim 1 wherein the reference elements comprise reference areas of a single material, and the signal elements comprise elements of the material separated from the single material.

21. Apparatus according to claim 1 wherein the common input condition is the temperature of the array of optical elements in the absence of the thermal signal.

22. Apparatus according to claim 1 wherein the common input condition is substantially the same for spatially adjacent signal and reference elements.

23. Apparatus according to claim 1 further comprised of a transducer for converting the output optical signal into an electronic signal for display.

24. Apparatus according to claim 1 wherein the thermally responsive optical property is transmission.

25. Apparatus according to claim 1 wherein the thermally responsive optical property is reflection.

26. Apparatus according to claim 1 wherein the thermally responsive optical property is refractive index.

27. Apparatus according to claim 1 wherein the thermally responsive optical property is polarization.

28. Apparatus, comprising:
an array of optical elements each having a thermally responsive optical property, the optical elements including a signal element and a reference element configured to provide a (1) a common-mode response of the optical property to a common input condition and (2) a differential-mode response of the optical property to a thermal signal appearing across the array of optical elements: and
an optical readout subsystem configured to generate an output optical signal by illuminating the array of optical elements with optical energy at a readout wavelength corresponding to the optical property so as to generate a composite optical signal having common-mode and differential-mode signal components corresponding to the common-mode and differential-mode responses respectively of the reference and signal elements,
wherein the output optical signal is substantially unchanged by a change in common input condition.

29. Apparatus according to claim 28 wherein the output optical signal is generated using a Fourier filter.

30. Apparatus according to claim 28 wherein the output optical signal is generated by optical interference of the common mode and differential mode optical signals.

31. Apparatus, comprising:
an array of optical elements each having a thermally responsive optical property, the optical elements including a signal element and a reference element configured to provide a signal-element response of the optical property to both common mode and thermal signals and a reference-element response of the optical property to common mode signals; and,
an optical readout subsystem configured to (1) illuminate the array of optical elements with optical energy at a readout wavelength corresponding to the optical property so as to generate a composite optical signal from the signal-element and reference-element response, (2) remove by optical means the common mode signal from the composite optical signal, and (3) generate an output optical signal.

32. Apparatus, comprising:
an array of optical elements each having a thermally responsive optical property, the optical elements including a signal element and a reference element configured to provide a signal-element response of the optical property to both common mode and thermal signals and a reference-element response of the optical property to common mode signals; and,
an optical readout subsystem configured to (1) illuminate the array of optical elements with optical energy at a readout wavelength corresponding to the optical property so as to generate signal and reference optical signals from the signal-element and reference-element responses respectively, and (2) generate from optical interference of the signal and reference optical signals an output optical signal being substantially representative of the thermal signal.

33. Apparatus according to claim 32 wherein the signal element are interspersed with a reference element.

34. Apparatus according to claim 33 wherein the optical readout system is further configured to displace the signal or reference optical signal.

35. Apparatus according to claim 34 wherein the optical readout system relies on polarization.

36. Apparatus according to claim 34 wherein the optical readout system relies on diffraction.

* * * * *